United States Patent
Hase et al.

(10) Patent No.: US 11,520,336 B2
(45) Date of Patent: Dec. 6, 2022

(54) CONTROL APPARATUS

(71) Applicant: DENSO CORPORATION, Kariya (JP)

(72) Inventors: Tomomi Hase, Kariya (JP); Noriaki Ikemoto, Kariya (JP); Mitsuharu Higashitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 164 days.

(21) Appl. No.: 16/352,434

(22) Filed: Mar. 13, 2019

(65) Prior Publication Data

US 2019/0286148 A1    Sep. 19, 2019

(30) Foreign Application Priority Data

Mar. 19, 2018    (JP) .............................. JP2018-050604

(51) Int. Cl.
*G05D 1/02* (2020.01)
*B60Q 9/00* (2006.01)

(52) U.S. Cl.
CPC ............ *G05D 1/0212* (2013.01); *B60Q 9/008* (2013.01); *G05D 1/0246* (2013.01); *G05D 1/0289* (2013.01); *G05D 1/0293* (2013.01); *G05D 2201/0213* (2013.01)

(58) Field of Classification Search
CPC .. G05D 1/0212; G05D 1/0246; G05D 1/0293; G05D 1/0289; G05D 2201/0213; B60Q 9/008
See application file for complete search history.

(56) References Cited

U.S. PATENT DOCUMENTS

| | | | |
|---|---|---|---|
| 9,940,834 B1* | 4/2018 | Konrardy | G08G 1/161 |
| 10,719,074 B2* | 7/2020 | Hua | B60W 50/06 |
| 2010/0007500 A1* | 1/2010 | Mestres | G08B 13/1427 340/572.4 |
| 2011/0106362 A1 | 5/2011 | Seitz | |
| 2015/0262435 A1* | 9/2015 | Delong | G07C 5/085 340/439 |
| 2019/0147745 A1* | 5/2019 | Kim | G08G 1/166 701/301 |
| 2019/0251743 A1* | 8/2019 | Koyama | G01C 21/3635 |
| 2020/0010118 A1* | 1/2020 | Fukaya | B62D 15/029 |
| 2020/0247343 A1 | 8/2020 | Ichinose et al. | |

FOREIGN PATENT DOCUMENTS

| | | | |
|---|---|---|---|
| JP | 2001-097072 A | 4/2001 | |
| JP | 2007-264818 A | 10/2007 | |

* cited by examiner

*Primary Examiner* — Thomas Ingram
(74) *Attorney, Agent, or Firm* — Oliff PLC

(57) ABSTRACT

A control apparatus for an automatic-driving vehicle includes a fall detecting unit and a collision preventing unit. The fall detecting unit detects that a load of the automatic-driving vehicle has fallen onto a road. The collision preventing unit performs a collision prevention process that is a process to prevent another vehicle from colliding with the load when the fall detecting unit detects that the load has fallen onto the road.

12 Claims, 11 Drawing Sheets

| WEIGHT \ SIZE | LARGE | SMALL |
|---|---|---|
| HEAVY | IN TRAFFIC LANE | IN TRAFFIC LANE |
| LIGHT | IN TRAFFIC LANE | ON ROAD SHOULDER |

…

CONTROL APPARATUS

CROSS-REFERENCE TO RELATED APPLICATION

This application is based on and claims the benefit of priority from Japanese Patent Application No. 2018-050604, filed Mar. 19, 2018. The entire disclosure of the above application is incorporated herein by reference.

BACKGROUND

Technical Field

The present invention relates to a control apparatus for an automatic-driving vehicle.

Related Art

The development of automatic-driving vehicles is advancing. An automatic-driving vehicle is a vehicle that is capable of automatically performing all driving operations (driving, steering, and braking) necessary for travel, without being based on manual operations by a passenger.

SUMMARY

The present disclosure provides a control apparatus for an automatic-driving vehicle. The control apparatus detects that a load of the automatic-driving vehicle has fallen onto a road. The control apparatus performs a collision prevention process that is a process to prevent another vehicle from colliding with the load when detected that the load has fallen onto the road.

DESCRIPTION OF THE EMBODIMENTS

Figure 1:
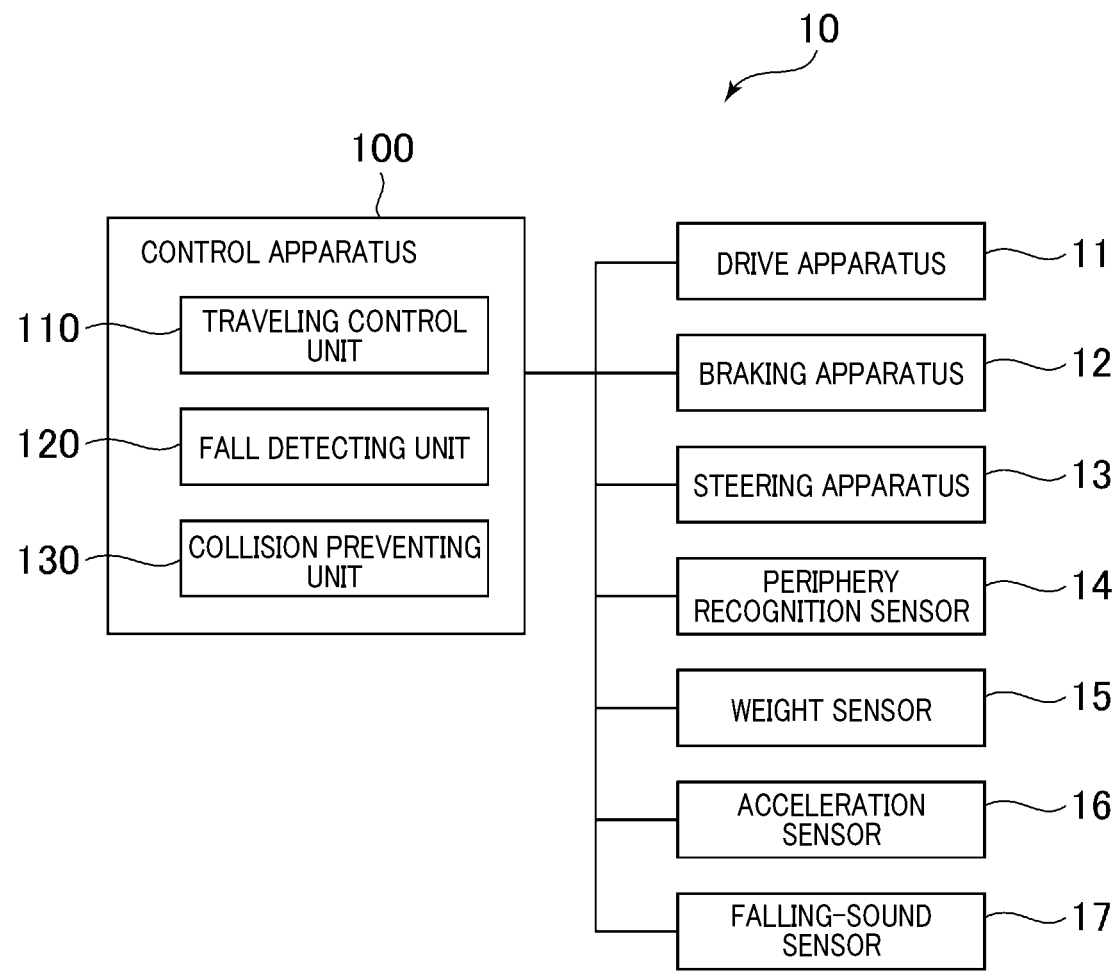
FIG. 1 is a diagram schematically showing an overall configuration of a control apparatus and an automatic-driving vehicle in which the control apparatus is mounted, according to a first embodiment.

In embodiments of the present disclosure, the following matters are considered.

It is thought that automatic-driving vehicles will become widely used not only as passenger cars for general household use, but also in the field of vehicles (such as trucks) that transport loads, such as cargo.

Here, regarding vehicles that transport loads, a load may fall onto a road as a result of shaking during traveling and the like. In such cases, the driver is required to immediately stop the vehicle and take action, such as removing the load from the road. Apparatuses that are capable of warning a driver when a load is assumed to have fallen are known.

However, when a vehicle that transports loads is an automatic-driving vehicle, even should a passenger be warned that a load has fallen onto the road, because the passenger is not performing the driving operations, the passenger has difficulty taking appropriate action, such as stopping the vehicle. An appropriate method of controlling the automatic-driving vehicle when a load falls onto the road has not been specifically examined in the past.

It is thus desired to provide a control apparatus that is capable of appropriately controlling an automatic-driving vehicle when a load has fallen onto a road.

An exemplary embodiment of the present disclosure provides a control apparatus for an automatic-driving vehicle. The control apparatus includes: a fall detecting unit that detects that a load of the automatic-driving vehicle has fallen onto a road; and a collision preventing unit that performs a collision prevention process that is a process to prevent another vehicle from colliding with the load when the fall detecting unit detects that the load has fallen onto the road.

In such a control apparatus, when the load of the automatic-driving vehicle falls onto the road, the fall detecting unit detects the falling of the load. At this time, the collision preventing unit performs the collision prevention process. The collision prevention process is a process to prevent another vehicle from colliding with the fallen load. For example, a process in which the automatic-driving vehicle is stopped near the fallen load and a passenger is prompted to remove the load can be given as the collision prevention process. As a result of the collision prevention process being performed, accidents that accompany the falling of the load can be prevented.

The exemplary embodiment provides a control apparatus that is capable of appropriately controlling an automatic-driving vehicle when a load has fallen onto a road.

Embodiments will hereinafter be described with reference to the accompanying drawings. To facilitate understanding of the descriptions, constituent elements in the drawings that are identical to each other are given the same reference numbers when possible. Redundant descriptions are omitted.

First Embodiment

A control apparatus 100 according to a first embodiment is mounted in an automatic-driving vehicle 10. The control apparatus 100 is configured as an apparatus that performs control of the automatic-driving vehicle 10. Before the control apparatus 100 is described, a configuration of the automatic-driving vehicle 10 will be described mainly with reference to FIG. 1.

Figure 2:
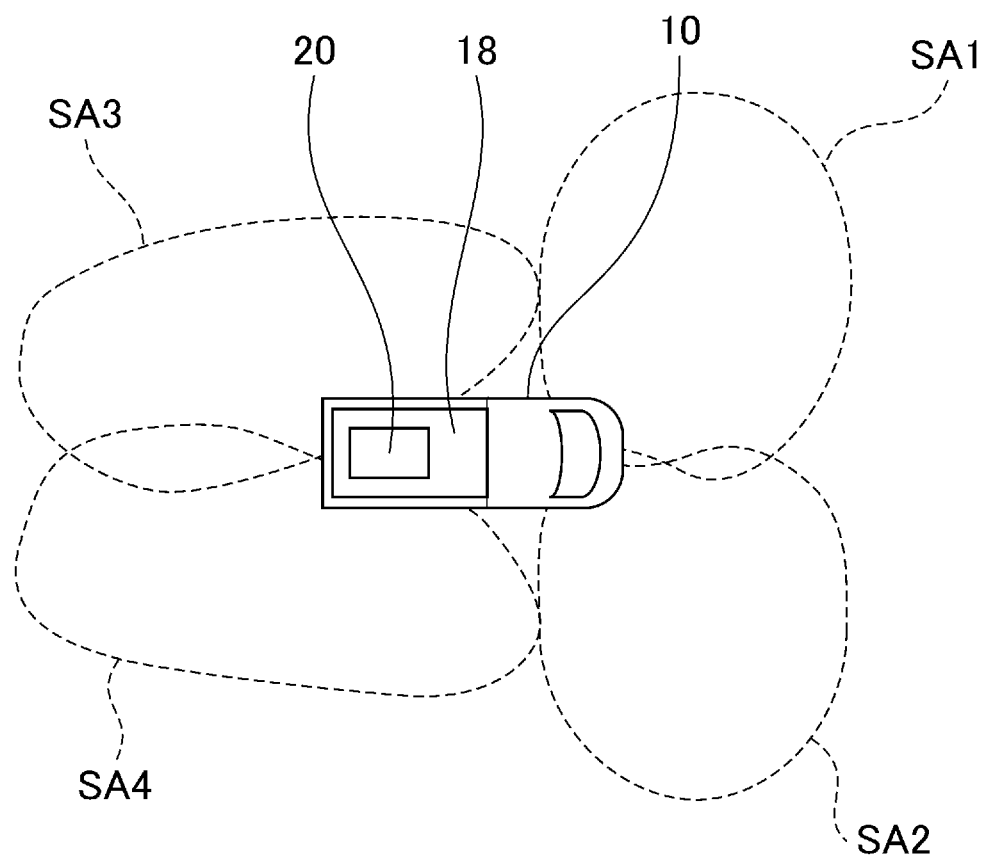
FIG. 2 is a diagram of recognition areas of a periphery recognition sensor provided in the automatic-driving vehicle.

The automatic-driving vehicle 10 is configured as a vehicle that is capable of automatically performing all driving operations (driving, steering, and braking) necessary for travel, without being based on manual operations by a passenger. As shown in FIG. 2, the automatic-driving vehicle 10 includes a load-carrying bed (load-carrying platform) 18. The automatic-driving vehicle 10 is capable of traveling in a state in which a load 20, such as cargo, is loaded onto the load-carrying bed 18.

As shown in FIG. 1, the automatic-driving vehicle 10 includes a drive apparatus 11, a braking apparatus 12, a steering apparatus 13, a periphery recognition sensor 14, a weight sensor 15, an acceleration sensor 16, and a falling-sound sensor 17.

The drive apparatus 11 generates driving force that is required for the automatic-driving vehicle 10 to travel. For example, the drive apparatus 11 is an internal combustion engine. However, the drive apparatus 11 may also be a motor generator. The control apparatus 100, described hereafter, controls operations of the drive apparatus 11.

The braking apparatus 12 decelerates or stops the automatic-driving vehicle 10 by generating braking force. The braking apparatus 12 according to the present embodiment is configured as a so-called eddy current braking apparatus (ECB). The control apparatus 100 controls operations of the braking apparatus 12.

The steering apparatus 13 performs steering of the automatic-driving vehicle 10. The steering apparatus 13 performs steering by applying steering force generated by electric power to a steering shaft. The control apparatus 100 controls operations of the steering apparatus 13.

The periphery recognition sensor 14 recognizes a state (such as positions of traffic lanes and presence of obstacles) surrounding the automatic-driving vehicle 10. According to the present embodiment, when the load 20 falls onto the road from the load-carrying bed 18 of the automatic-driving vehicle 10, the periphery recognition sensor 14 recognizes the falling of the load 20 and a fall position of the load 20.

The periphery recognition sensor 14 is configured by a plurality of cameras. These cameras are attached to a plurality of locations on an outer periphery of the automatic-driving vehicle 10. In FIG. 2, areas that can be captured by the cameras, that is, areas in which the falling of the load 20 and the like can be recognized are respectively denoted by SA1, SA2, SA3, and SA4. SA1 is an area on the front-left side of the automatic-driving vehicle 10. SA2 is an area on the front-right side of the automatic-driving vehicle 10. SA3 is an area on the rear-left side of the automatic-driving vehicle 10. SA4 is an area on the rear-right side of the automatic-driving vehicle 10.

The periphery recognition sensor 14 is capable of separately recognizing the respective states in SA1, SA2, SA3, and SA4, such as those described above. Therefore, when the load 20 falls from the load-carrying bed 18, not only is the falling of the load 20 recognized, but also the direction and position in which the load 20 has fallen and the shape (size) of the fallen load 20 can be recognized by any of the cameras. Information recognized by the periphery recognition sensor 14 is transmitted to the control apparatus 100.

Here, in addition to the cameras, laser imaging detection and ranging (LIDAR) or a radar may be used as the periphery recognition sensor 14 such as that described above. Furthermore, the periphery recognition sensor 14 may be configured by a combination of a plurality of types of sensors.

The weight sensor 15 detects an overall weight of the automatic-driving vehicle 10 including the load 20. For example, the weight sensor 15 detects the weight of the automatic-driving vehicle 10 based on an amount of sinking of a suspension (not shown) provided in the automatic-driving vehicle 10. The weight detected by the weight sensor 15 is transmitted to the control apparatus 100. The control apparatus 100 can detect the falling of the load 20 and the weight of the fallen load 20 based on the change in the weight of the automatic-driving vehicle 10 as well.

The acceleration sensor 16 detects acceleration of the automatic-driving vehicle 10. The acceleration detected by the acceleration sensor 16 is transmitted to the control apparatus 100. When the load 20 falls from the load-carrying bed 18, the acceleration of the automatic-driving vehicle 10 changes in accompaniment with the change in the weight of the automatic-driving vehicle 10. The acceleration sensor 16 detects the change in the acceleration. In addition, the acceleration sensor 16 may also detect impact that occurs when the load 20 falls onto the road. The control apparatus 100 can detect the falling of the load 20 and the weight of the fallen load 20 based on the acceleration detected by the acceleration sensor 16 as well.

The falling-sound sensor 17 detects sound that is generated in the periphery of the automatic-driving vehicle 10. Specifically, the falling-sound sensor 17 is a microphone. Information indicating the volume of the sound detected by the falling-sound sensor 17 is transmitted to the control apparatus 100. The control apparatus 100 can detect the falling of the load 20 and a rough weight of the fallen load 20 based on the information on the sound detected by the falling-sound sensor 17 as well.

Next, a continued description of the configuration of the control apparatus 100 will be given with reference to FIG. 1. The control apparatus 100 controls the overall operations of the automatic-driving vehicle 10. The control apparatus 100 is configured as a computer system that includes a central processing unit (CPU), a read-only memory (ROM), a random access memory (RAM), and the like. The control apparatus 100 according to the present embodiment is configured as a single apparatus. However, a mode in which the control apparatus 100 is configured by a plurality of apparatuses (computer systems) and the apparatuses operate while communicating with one another is also possible. In addition, a mode in which the control apparatus 100, in part or in its entirety, is configured as a part of another electronic control unit (ECU) that is mounted in the automatic-driving vehicle 100 is also possible.

As a functional control block, the control apparatus 100 includes a traveling control unit 110, a fall detecting unit 120, and a collision preventing unit 130.

The traveling control unit 110 controls each of the drive apparatus 11, the braking apparatus 12, and the steering apparatus 13, described above, to perform processes that are necessary for the automatic-driving vehicle 10 to automatically travel. The traveling control unit 110 makes the automatic-driving vehicle 10 automatically travel along a course that is set in advance by a navigation system (not shown). In addition, when the periphery recognition sensor 14 detects the presence of an obstacle on the course, the traveling control unit 110 performs processes, such as making the automatic-driving vehicle 10 travel on a path so as to avoid the obstacle or making the automatic-driving vehicle 10 perform an emergency stop, as required.

The fall detecting unit 120 detects that the load 20 has fallen onto the road from the load-carrying bed 18. The fall detecting unit 120 detects that the load 20 has fallen onto the road from the load-carrying bed 18 using at least some of the information transmitted from the periphery recognition sensor 14, the weight sensor 15, the acceleration sensor 16, and the falling-sound sensor 17. In addition, the fall detecting unit 120 can also detect the position, size, weight, and the like of the fallen load 20.

The collision preventing unit 130 performs a collision prevention process. The "collision prevention process" is performed to prevent another vehicle from colliding with the load 20 when the fall detecting unit 120 detects that the load 20 has fallen onto the road from the load-carrying bed 18. As a result of the collision preventing unit 130 performing a collision prevention process such as this, accidents and the like accompanying the falling of the load 20 can be prevented.

Figure 3A:
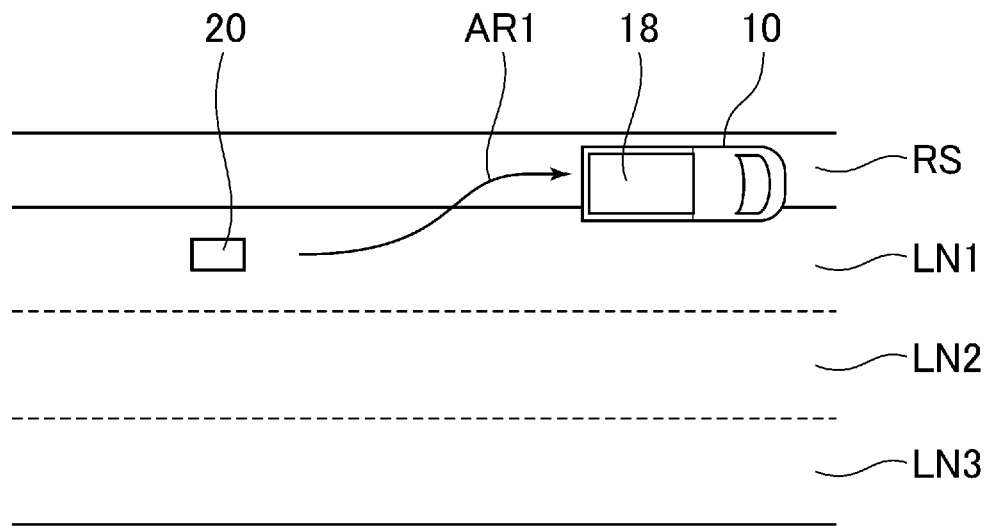
FIG. 3A and FIG. 3B are diagrams for explaining an overview of a collision prevention process.
Figure 3B:
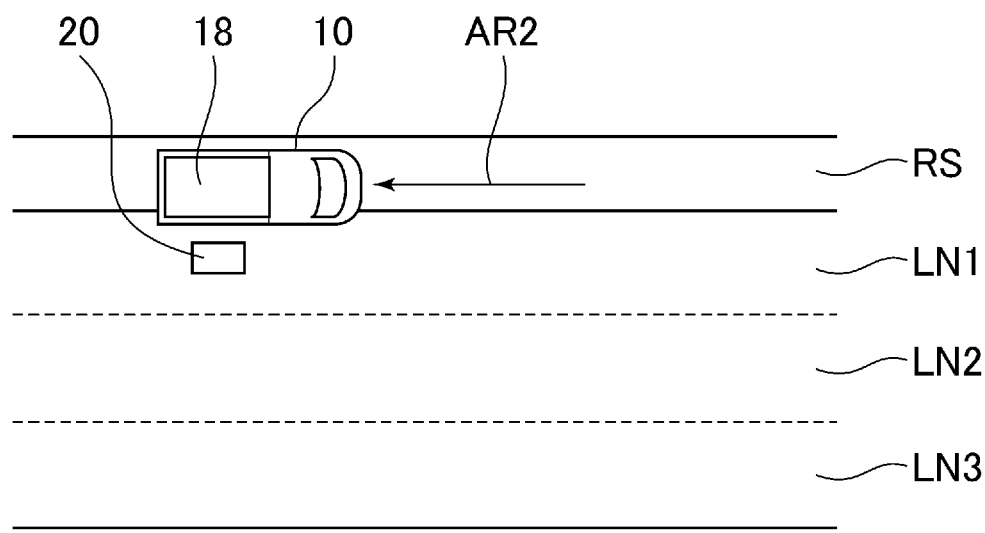

A specific example of the collision prevention process will be described with reference to FIG. 3A and FIG. 3B. FIG. 3A and FIG. 3B show a top view of a road on which the automatic-driving vehicle 10 is traveling. The road has a traffic lane LN1 that is the leftmost traveling lane, a traffic lane LN2 that is the center traveling lane, and a traffic lane LN3 that is the rightmost traveling lane. In addition, a road shoulder RS is formed further leftward than the traffic lane LN1. The "road shoulder" in the description hereafter widely refers to an area (an area outside of the traveling lanes) in which vehicles do not ordinarily travel. The definition of the "road shoulder" herein may differ from the legal definition of a "road shoulder."

FIG. 3A shows an example of a case in which the load 20 falls onto the road from the load-carrying bed 18 when the automatic-driving vehicle 10 is traveling in the traffic lane LN1. The load 20 in this example falls rearward from the load-carrying bed 18. Therefore, the load 20 falls into the traffic lane LN1 in which the automatic-driving vehicle 10 is traveling.

As described above, the fall detecting unit 120 detects the falling of the load 20. In accompaniment, the collision preventing unit 130 moves the automatic-driving vehicle 10 onto the road shoulder RS on the left side as indicated by an arrow AR1 and stops the automatic-driving vehicle 10 on the road shoulder RS. The collision preventing unit 130 performs control of the automatic-driving vehicle 10 such as this through the traveling control unit 110.

As a result of a process such as that described above being performed, the automatic-driving vehicle 10 stops in a position that is relatively near the fallen load 20. Therefore, the passenger of the automatic-driving vehicle 10 can take action, such as getting out of the automatic-driving vehicle 10 onto the road and removing the load 20, with certainty. In addition, because the automatic-driving vehicle 10 is stopped on the road shoulder RS, traveling of other vehicles is not obstructed.

In this manner, the collision prevention process according to the present embodiment includes a process to stop the automatic-driving vehicle 10 and, specifically, a process to stop the automatic-driving vehicle 10 on the road shoulder RS.

The automatic-driving vehicle 10 may be moved backward from the state shown in FIG. 3A to bring the automatic-driving vehicle 10 even closer to the position of the fallen load 20. FIG. 3B shows an example of a case in which the automatic-driving vehicle 10 is moved backward so as to follow an arrow AR2, and thereby being positioned beside the fallen load 20. When such control performed, the operation by the passenger of the automatic-driving vehicle 10 to remove the load 20 can be further facilitated.

Another example of the collision prevention process will be described with reference to FIG. 4A and FIG. 4B. In a manner similar to FIG. 3A and FIG. 3B, FIG. 4A and FIG. 4B also show a top view of the road on which the automatic-driving vehicle 10 is traveling.

Figure 4A:
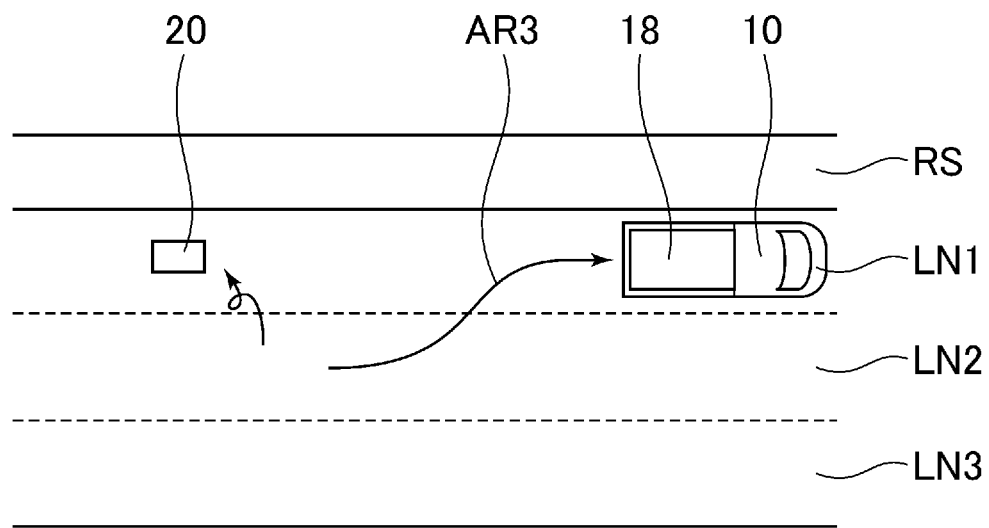
FIG. 4A and FIG. 4B are diagrams for explaining an overview of the collision prevention process.

FIG. 4A shows an example of a case in which the load 20 falls onto the road from the load-carrying bed 18 when the automatic-driving vehicle 10 is traveling in the traffic lane LN2. The load 20 in this example falls in a lateral direction from the load-carrying bed 18. Therefore, the load 20 falls into the traffic lane LN1 on the left side of the traffic lane LN2 in which the automatic-driving vehicle 10 is traveling.

In this example as well, the fall detecting unit 120 detects that the load 20 has fallen. In accompaniment, the collision preventing unit 130 moves the automatic-driving vehicle 10 to the traffic lane LN1 on the left side, that is, the traffic lane LN1 that is the same traffic lane as that in which the fallen load 20 is present, as indicated by an arrow AR3. The collision preventing unit 130 then stops the automatic-driving vehicle 10 in the traffic lane LN1 (that is, after performing lane change). The collision preventing unit 130 performs control of the automatic-driving vehicle 10 such as this, as well, through the traveling control unit 110.

In this example as well, the automatic-driving vehicle 10 is stopped in a position that is relatively close to the fallen load 20. Therefore, the passenger of the automatic-driving vehicle 10 can take action, such as getting out of the automatic-driving vehicle 10 onto the road and removing the load 20, with certainty.

In addition, the position of the stopped automatic-driving vehicle 10 is a position ahead of the fallen load 20 in the same traffic lane. Therefore, from the perspective of another vehicle that is approaching from behind, the automatic-driving vehicle 10 that is larger than the load 20 is present in an overlapping manner in a position that is farther ahead of the load 20 that is present ahead. A driver of the other vehicle performs deceleration or steering to avoid collision with the visible automatic-driving vehicle 10. Therefore, as a result, the other vehicle can avoid collision with the load 20 as well.

In this manner, the collision prevention process according to the present embodiment also includes a process to stop the automatic-driving vehicle 10 in the same traffic lane as that in which the fallen load 20 is present.

The automatic-driving vehicle 10 may be moved backward from the state shown in FIG. 4A to bring the automatic-driving vehicle 10 even closer to the position of the fallen load 20. FIG. 4B shows an example of a case in which the automatic-driving vehicle 10 is moved backward so as to follow an arrow AR4, thereby being moved to a position that is slightly ahead of the fallen load 20 and stopped. When such control performed, the likelihood of another vehicle colliding with the fallen load 20 can be further reduced. In addition, in a manner similar to that in the example in FIG. 3B, the operation by the passenger of the automatic-driving vehicle 10 to remove the load 20 can be further facilitated.

Here, when the position in which the load 20 has fallen is in the same traffic lane as that in which the automatic-driving vehicle 10 is traveling, the automatic-driving vehicle 10 may be stopped as is in this traffic lane without changing traffic lanes. Subsequently, the automatic-driving vehicle 10 may be moved backward and brought closer to the load 20, as required.

Another example of the collision prevention process will be described with reference to FIG. 5A and FIG. 5B. FIG.

Figure 5A:
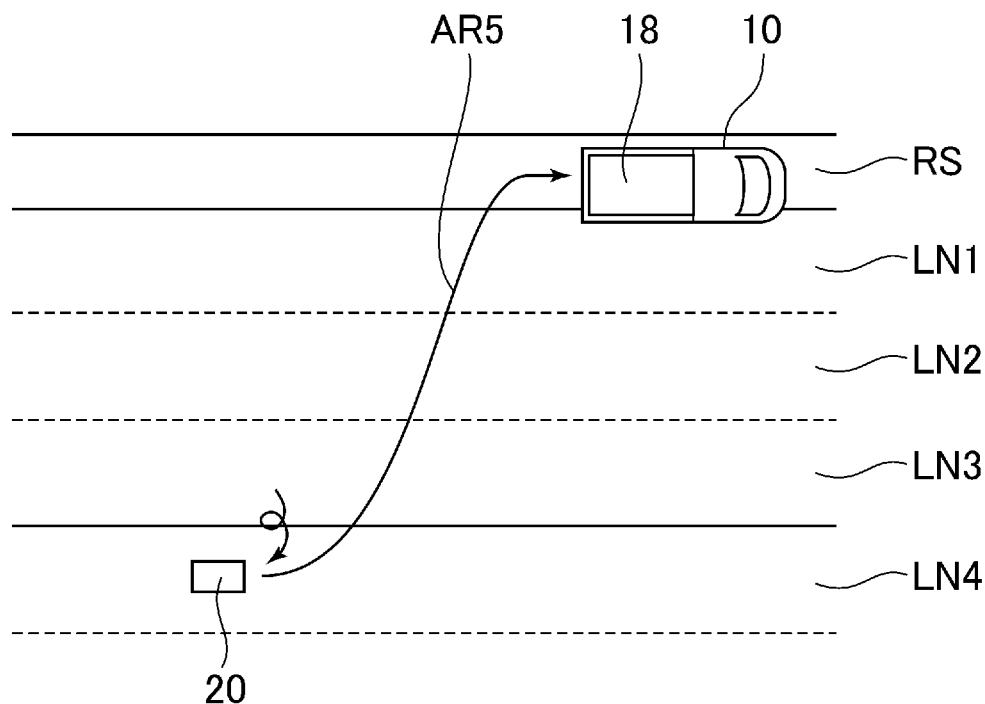
FIG. 5A and FIG. 5B are diagrams for explaining an overview of the collision prevention process.
Figure 5B:
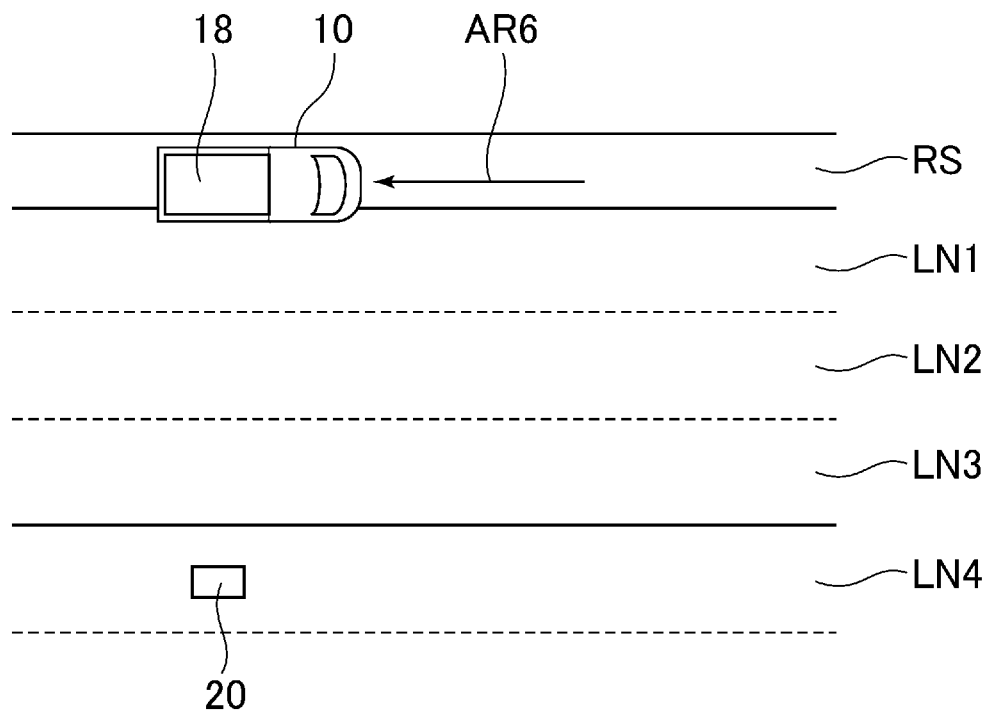

5A and FIG. 5B shows an oncoming traffic lane LN4 in addition to the traffic lanes LN1, LN2, and LN3. The oncoming traffic lane LN4 is a traffic lane in which vehicles traveling in a direction opposite that of the automatic-driving vehicle 10 pass.

FIG. 5A shows an example of a case in which the load 20 falls onto the road from the load-carrying bed 18 when the automatic-driving vehicle 10 is traveling in the traffic lane LN3. The load 20 in this example falls in a lateral direction from the load-carrying bed 18. Therefore, the load 20 falls into the oncoming traffic lane LN4 on the right side of the traffic lane LN3 in which the automatic-driving vehicle 10 is traveling.

In this example as well, the fall detecting unit 120 detects that the load 20 has fallen. In accompaniment, the collision preventing unit 130 moves the automatic-driving vehicle 10 onto the road shoulder RS on the left side, as indicated by an arrow AR5. The collision preventing unit 130 then stops the automatic-driving vehicle 10 on the road shoulder RS. The collision preventing unit 130 performs control of the automatic-driving vehicle 10 such as this, as well, through the traveling control unit 110.

In this example as well, the automatic-driving vehicle 10 is stopped in a position that is relatively close to the fallen load 20. Therefore, the passenger of the automatic-driving vehicle 10 can take action, such as getting out of the automatic-driving vehicle 10 onto the road and removing the load 20, with certainty.

Figure 4B:
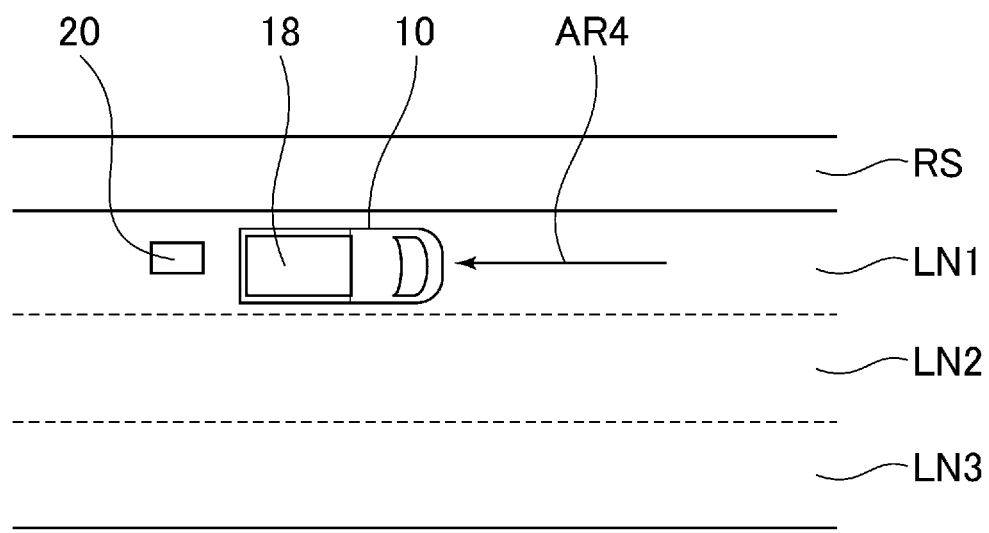

Unlike in the example shown in FIG. 4A and FIG. 4B, in the example shown in FIG. 5A and FIG. 5B, the automatic-driving vehicle 10 cannot be moved to the same traffic lane as that in which the fallen load 20 is present and stopped therein. Therefore, the automatic-driving vehicle 10 is stopped on the road shoulder RS.

The automatic-driving vehicle 10 may be moved backward from the state shown in FIG. 5A to bring the automatic-driving vehicle 10 even closer to the position of the fallen load 20. FIG. 5B shows an example of a case in which the automatic-driving vehicle 10 is moved backward so as to follow an arrow AR6, thereby being moved closer to the fallen load 20. When such control performed, the operation by the passenger of the automatic-driving vehicle 10 to remove the load 20 can be further facilitated.

A flow of processes performed by the control apparatus 100 to actualize the collision prevention process such as that described above will be described with reference to FIG. 6. The control apparatus 100 repeatedly performs the series of processes shown in FIG. 6 each time a predetermined cycle elapses.

At an initial step S01 of the series of processes, the control apparatus 100 determines whether the load 20 has fallen onto the road from the load-carrying bed 18. The control apparatus 100 performs the determination based on the detection result from the fall detecting unit 120. When determined that the falling of the load 20 is not detected (i.e., a NO determination is made at step S01), the control apparatus 20 proceeds to step S02. In this case, the collision prevention process by the collision preventing unit 130 is not performed and the automatic-driving vehicle 10 continues traveling.

When determined that the falling of the load 20 is detected at step S01 (i.e., a YES determination is made at step S01), the control apparatus 100 proceeds to step S03. At step S03, the control apparatus 100 first performs a process to acquire the size in the shape of the fallen load 20 (referred to, hereafter, as simply the "size of the load 20"). For example, the control apparatus 100 can analyze images captured by the periphery recognition sensor 14 that is configured by cameras. The control apparatus 10 can then acquire the size of the load 20 through calculation based on the area in the image that is occupied by the load 20 or the like. In addition, the control apparatus 100 may acquire the size of the load 20 through estimation based on the amount of change in the weight detected by the weight sensor 15 accompanying the fall (that is, the weight of the fallen load 20).

Subsequently, at step S03, the control apparatus 100 determines whether the size of the fallen load 20 is greater than a predetermined threshold TH1. For example, the threshold TH1 is set in advance as a threshold that indicates a size of an extent to which a driver of another vehicle does not notice the presence of the load 20. When determined that the size of the load 20 is greater than the threshold TH1 (i.e., a YES determination is made at step S03), the control apparatus 100 proceeds to step S04.

At step S04, the control apparatus 100 performs a process to notify another vehicle traveling in the periphery that the load 20 has fallen, through communication. This process is performed by the collision preventing unit 130 of the control apparatus 100. The notification to the other vehicle may be directly transmitted to the other vehicle, or may be indirectly transmitted through communication via a management center or the like.

At this time, information notified to the other vehicle may include at least some of the position, weight and shape of the fallen load 20, in addition to the information that the load 20 has fallen. Furthermore, the information notified to the other vehicle may also include a request that the other vehicle perform braking. As a result of such a notification being issued by the collision preventing unit 130, a situation in which the other vehicle collides with the fallen load 20 can be prevented. The process (notification) performed at step S04 is also included in the collision prevention process according to the present embodiment.

Here, the control apparatus 100 may change the mode of the notification at step S04 based on the weight or shape of the fallen load 20. For example, when the shape of the load 20 is large or when the weight of the load 20 is heavy, a signal requesting that the other vehicle perform braking may be transmitted together with the information indicating the position of the load 20 and the like. Meanwhile, when the shape of the load 20 is small or the weight is light, only the position of the load 20 and the like may be transmitted, without the signal requesting that the other vehicle perform braking being transmitted.

After performing the process at step S04, the control apparatus 100 proceeds to step S05. When determined that the size of the fallen load 20 is equal to or less than the threshold TH1 at step S03 (i.e., a NO determination is made at step S03), the control apparatus 100 proceeds to step S05 without issuing the notification to the other vehicle.

According to the present embodiment, when the load 20 that is small enough to be unnoticeable to the driver of the other vehicle has fallen, the notification to the other vehicle is not issued. A reason for this is that, should a situation in which the driver of the other vehicle does not notice the load 20 despite receiving notification thereof repeatedly occur, the driver will eventually mistake subsequent notifications for errors and ignore the notifications. According to the present embodiment, to prevent the driver from forming such a mistaken impression, the notification is not issued when the load 20 is small.

At step S05, the control apparatus 100 determines whether the size of the fallen load 20 is greater than a predetermined threshold TH2. The threshold TH2 is a value that is greater than the above-described threshold TH1. For example, the threshold TH2 is set in advance as a threshold that indicates a size to an extent to which damage is relatively small even should the other vehicle collide with the load 20. Here, the threshold TH1 and the threshold TH2 may be set to differing values as according to the present embodiment. However, the threshold TH1 and the threshold TH2 may also be set to the same value.

When determined that the size of the load 20 is equal to or less than the threshold TH2 (i.e., a NO determination is made at step S05), the control apparatus 10 proceeds to step S06. As in the example described with reference to FIG. 3A, at step S06, the process to move the automatic-driving vehicle 10 onto the road shoulder RS and stop the automatic-driving vehicle 10 is performed as the collision prevention process. In this case, compared to when the automatic-driving vehicle 10 is stopped in the same traffic lane as that of the load 20, the likelihood of the other vehicle colliding with the load 20 increases. However, because the load 20 is relatively small, securing the safety of the automatic-driving vehicle 10 is prioritized by the automatic-driving vehicle 10 being stopped on the road shoulder RS.

When determined that the size of the fallen load 20 is greater than the threshold TH2 at step S05 (i.e., a YES determination is made at step S05), the control apparatus 100 proceeds to step S07. Processes similar to those described with reference to FIG. 4A and FIG. 4B are performed at step S07 and subsequent steps.

At step S07, the control apparatus 100 determines whether the direction in which the load 20 has fallen is behind the automatic-driving vehicle 10 (rather than to the side thereof). When determined that the load 20 has fallen behind the automatic-driving vehicle 10 (i.e., a YES determination is made at step S07), the control apparatus 100 proceeds to step S08. The control apparatus 100 proceeding to step S08 means that the load 20 has fallen in the same traffic lane as the traffic lane in which the automatic-driving vehicle 10 is traveling.

Therefore, at step S08, the process to stop the automatic-driving vehicle 10 in the traffic lane in which the automatic-driving vehicle 10 is currently traveling without changing lanes is performed as the collision prevention process. Subsequently, the control apparatus 100 performs, as required, the process to move the automatic-driving vehicle 10 backward and bring the automatic-driving vehicle 10 closer to the load 20, as shown in FIG. 4B.

When determined that the direction in which the load 20 has fallen is to the side of the automatic-driving vehicle 10 (i.e., a NO determination is made at step S07), the control apparatus 100 proceeds to step S10. At step S10, the control apparatus 10 determines whether the load 20 has fallen into the oncoming traffic lane. When determined that the load 20 has not fallen into the oncoming traffic lane (i.e., a NO determination is made at step S10), the control apparatus 100 proceeds to step S09. The control apparatus 100 proceeding to step S09 means that the load 20 has fallen into a traffic lane that differs from the traffic lane in which the automatic-driving vehicle 10 is traveling and that is of the same advancing direction as the automatic-driving vehicle 10.

Therefore, as in the example in FIG. 4A, at step S09, the process to make the automatic-driving vehicle 10 change traffic lanes and stop the automatic-driving vehicle 10 in the traffic lane in which the load 20 has fallen is performed as the collision prevention process. Subsequently, the control apparatus 100 performs, as required, the process to move the automatic-driving vehicle 10 backward and bring the automatic-driving vehicle 10 closer to the load 20, as shown in FIG. 4B.

When determined that the load 20 has fallen into the oncoming traffic lane at step S10 (i.e., a YES determination is made at step S10), the control apparatus 100 proceeds to step S101. As in the example described with reference to FIG. 5A, at step S101, the process to move the automatic-driving vehicle 10 onto the road shoulder RS and stop the automatic-driving vehicle 10 is performed as the collision prevention process. Subsequently, the control apparatus 100 performs, as required, the process to move the automatic-driving vehicle 10 backward and bring the automatic-driving vehicle 10 closer to the load 20, as shown in FIG. 5B.

As described above, the collision preventing unit 130 according to the present embodiment changes the stopping position of the automatic-driving vehicle 10 in the collision prevention process based on the shape of the fallen load 20. Specifically, when the shape of the fallen load 20 is small, the collision preventing unit 130 stops the automatic-driving vehicle 10 on the road shoulder RS (step S06). When the shape of the fallen load 20 is large, the collision preventing unit 130 stops the automatic-driving vehicle 10 in the same traffic lane as that in which the fallen load 20 is present (steps S08 and S09). Consequently, the collision prevention process can be performed in a mode that is suitable for the state, and collision of another vehicle with the load 20 can be prevented.

Second Embodiment

Figure 6:
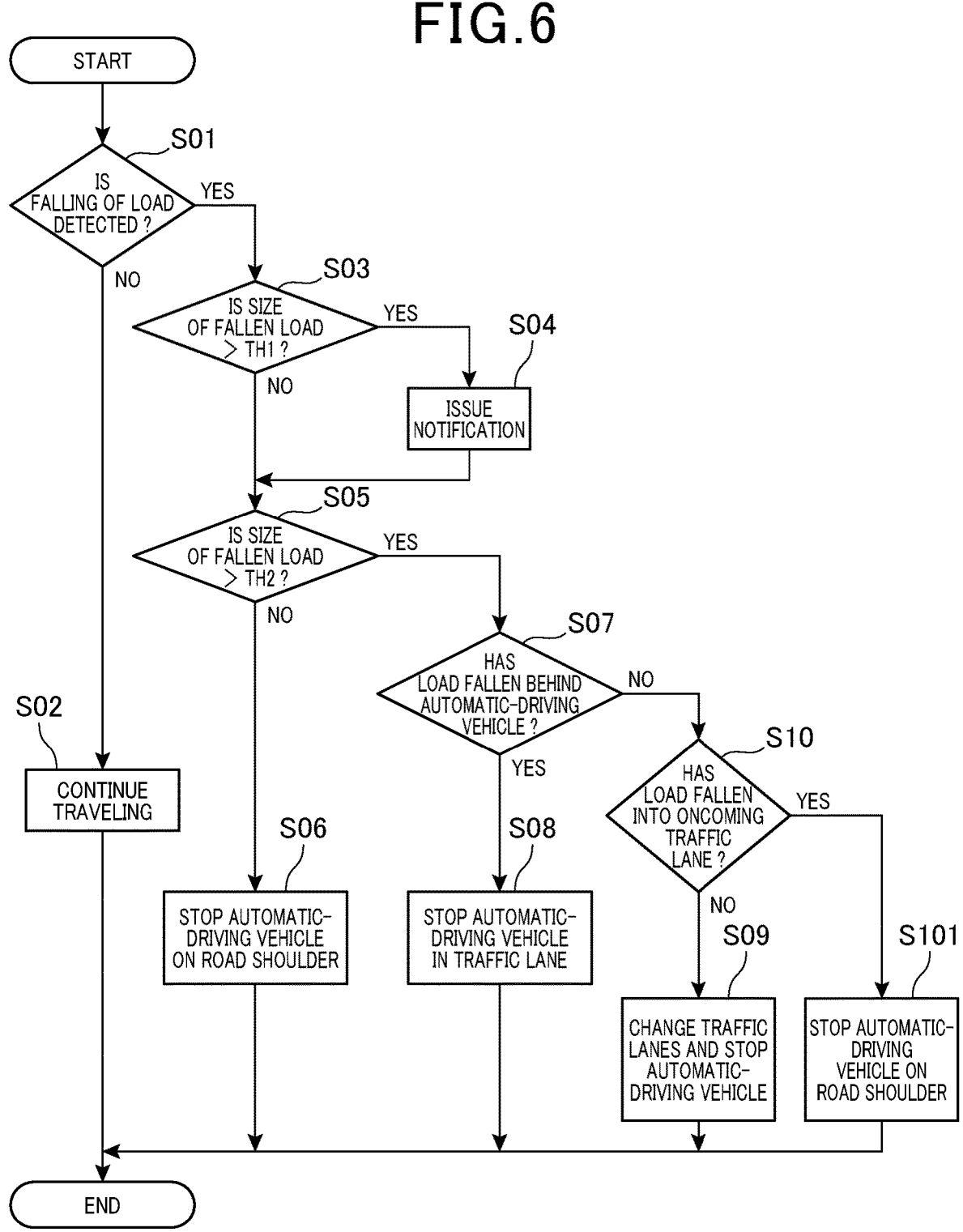
FIG. 6 is a flowchart of the flow of processes performed by the control apparatus in FIG. 1.
Figure 7:
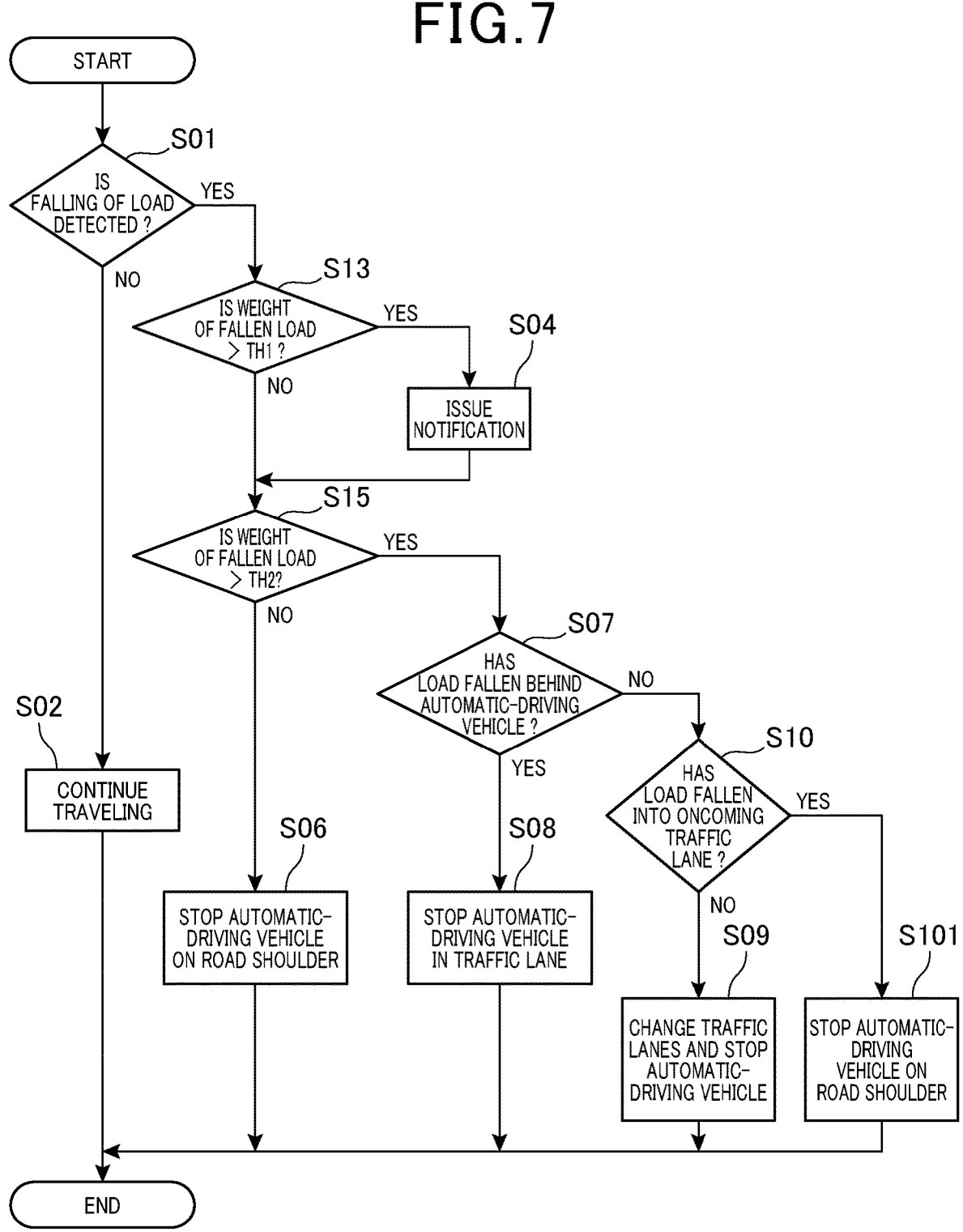
FIG. 7 is a flowchart of the flow of processes performed by a control apparatus according to a second embodiment.

Next, a second embodiment will be described. According to the present embodiment, only the mode of the collision prevention process performed by the control apparatus 100 differs from that according to the first embodiment. The processes performed by the control apparatus 100 will be described with reference to FIG. 7. The series of processes shown in FIG. 7 is performed in place of the series of processes shown in FIG. 6. In the series of processes, step S03 in FIG. 6 is replaced by step S13 and step S05 in FIG. 6 is replaced by step S15.

When determined that the falling of the load 20 is detected at step S01, the control apparatus 100 proceeds to step S13. At step S13, the control apparatus 100 first performs a process to acquire the weight of the fallen load 20. For example, the control apparatus 100 can acquire the weight of the fallen load 20 based on the amount of change in the weight detected by the weight sensor 15 in accompaniment with the fall. In addition, the control apparatus 100 can acquire the weight of the fallen load 20 through calculation based on information from the weight senor 15, the acceleration sensor 16, and the falling-sound sensor 17.

Subsequently, at step S13, the control apparatus 100 determines whether the weight of the fallen load 20 is greater than a predetermined threshold TH1. For example, the threshold TH1 according to the present embodiment is set in advance as a threshold that indicates a weight that is light enough that the vehicle body of the other vehicle is hardly damaged, even should the other vehicle collide with the load 20. When determined that the weight of the load 20 is greater than the threshold TH1 (i.e., a YES determination is made at step S13), the control apparatus 100 proceeds to step S04. The process performed at step S04 is the same as that according to the first embodiment.

When determined that the weight of the load 20 is equal to or less than the threshold TH1 at step S13 (i.e., a NO determination is made at step S13) or after completing the process at step S04, the control apparatus 100 proceeds to step S15. At step S15, the control apparatus 100 determines whether the weight of the fallen load 20 is greater than a predetermined threshold TH2. The threshold TH2 is a value that is greater than the threshold TH1, described above. For example, the threshold TH2 is set in advance as a threshold that indicates a weight of an extent to which damage is relatively small, even should the other vehicle collide with the load 20.

When determined that the weight of the load 20 is equal to or less than the threshold TH2 (i.e., a NO determination is made at step S15), the control apparatus 100 proceeds to step S06. When determined that the weight of the load 20 is greater than the threshold TH2 (i.e., a YES determination is made at step S15), the control apparatus 100 proceeds to step S07. The respective processes that are performed when the control apparatus 100 proceeds to step S06 and step S07 are the same as those according to the first embodiment.

As described above, the collision preventing unit 130 according to the present embodiment changes the stopping position of the automatic-driving vehicle 10 in the collision prevention process based on the weight of the fallen load 20. Specifically, when the weight of the fallen load 20 is light (low), the collision preventing unit 130 stops the automatic-driving vehicle 10 on the road shoulder RS (step S06). When the weight of the fallen load 20 is heavy (high), the collision preventing unit 130 stops the automatic-driving vehicle 10 in the same traffic lane as that in which the fallen load 20 is present (steps S08 and S09). Consequently, the collision prevention process can be performed in a mode that is suitable for the state, and collision of another vehicle with the load 20 can be prevented.

Third Embodiment

Figure 8:
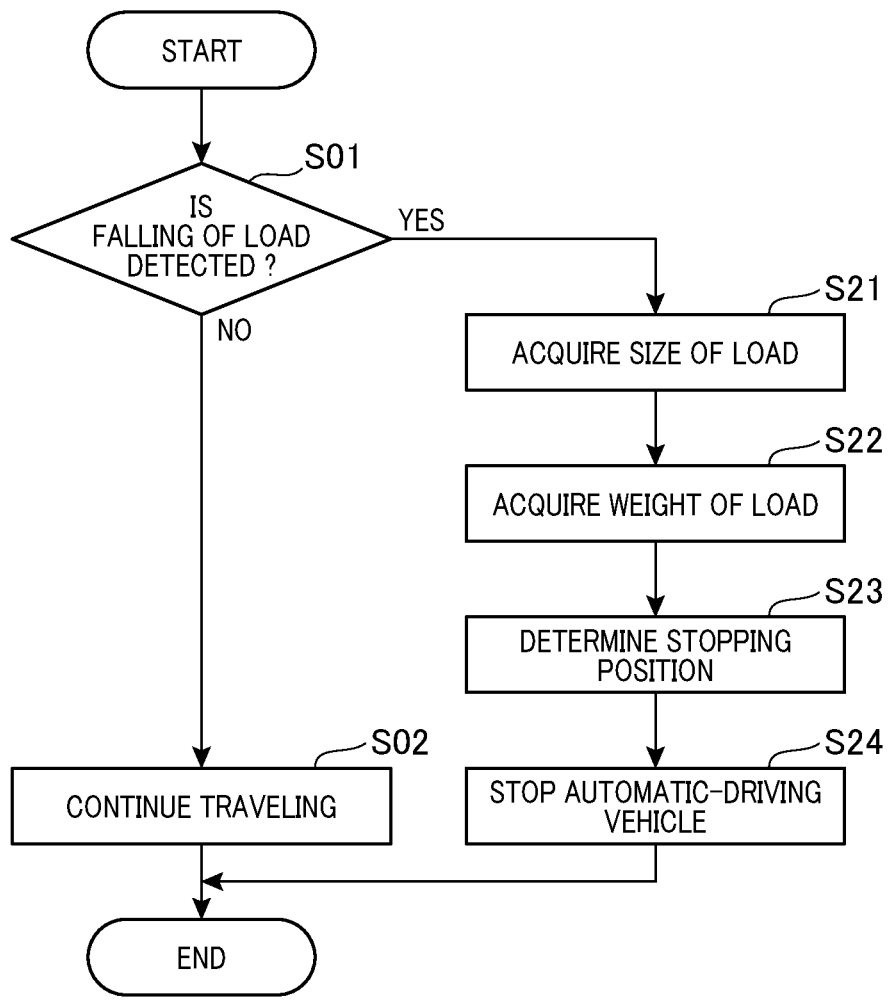
FIG. 8 is a flowchart of the flow of processes performed by a control apparatus according to a third embodiment.

Next, a third embodiment will be described. According to the present embodiment, only the mode of the collision prevention process performed by the control apparatus 100 differs from that according to the first embodiment. The processes performed by the control apparatus 100 will be described with reference to FIG. 8. The series of processes shown in FIG. 8 is performed in place of the series of processes shown in FIG. 6. In the series of processes, the content of the process that is performed when the falling of the load 20 is detected at step S01 differs from that according to the first embodiment in FIG. 6.

When determined that the falling of the load 20 is detected at step S01 (i.e., a YES determination is made at step S01), the control apparatus 100 proceeds to step S21. At step S21, the control apparatus 100 performs a process to acquire the size of the fallen load 20. The method for acquiring the size of the load 20 is the same as the method described regarding step S03 in FIG. 6.

At step S22 following step S21, the control apparatus 100 performs a process to acquire the weight of the fallen load 20. The method for acquiring the weight of the load 20 is the same as the method described regarding step S13 in FIG. 7.

At step S23 following step S22, the control apparatus 100 performs a process to determine the stopping position of the automatic-driving vehicle 10 when the automatic-driving vehicle 10 is stopped as the collision prevention process, based on both the weight and the shape of the load 20. The method for determining the stopping position will be described with reference to FIG. 9.

Figures 9, 10:
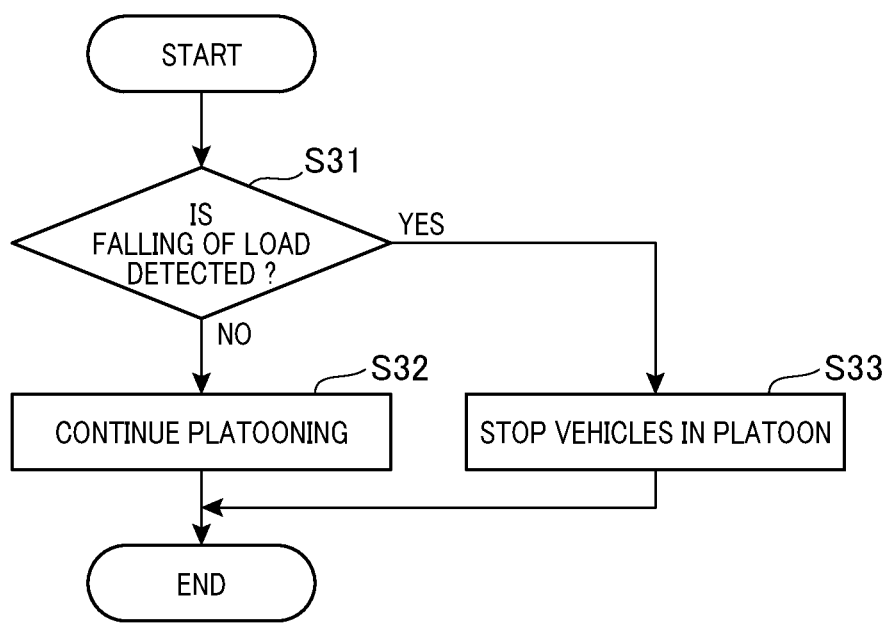
FIG. 9 is a diagram of a method for determining a stopping position.
FIG. 10 is a flowchart of the flow of processes performed by a control apparatus according to a fourth embodiment.

As shown in FIG. 9, according to the present embodiment, when the size of the fallen load 20 is small, such as a value that is equal to or less than a predetermined value, and the weight of the load 20 is light, such as a value that is equal to or less than a predetermined value, the stopping position of the automatic-driving vehicle 10 is set to the road shoulder RS. In other cases, the stopping position of the automatic-driving vehicle 10 is set to the same traffic lane as that of the load 20.

At step 24 following step S23, the control apparatus 100 performs a process to stop the automatic-driving vehicle 10 in the position set at step S23, as the collision prevention process. In addition, the control apparatus 100 may also perform a process to notify the other vehicle in a manner similar to that at step S04, as the collision prevention process as well.

For example, when the load 20 is a large plastic sheet, the weight of the load 20 is light. However, should the plastic sheet obstruct the field of view of another vehicle, the other vehicle is placed in danger. Therefore, according to the present embodiment, even when the weight of the fallen load 20 is light, the automatic-driving vehicle 10 is stopped in the same traffic lane as that of the load 20 when the load 20 is large. Consequently, the other vehicle can be prevented from colliding with the load 20 and being placed in a dangerous state.

In addition, when the weight of the fallen load 20 is very heavy regardless of being relatively small in size, should another vehicle collide with the load 20, an accident, such as the other vehicle flipping over, may occur. Therefore, according to the present embodiment, even when the size of the fallen load 20 is small, the automatic-driving vehicle 10 is stopped in the same traffic lane as that of the load 20 when the load 20 is heavy. Consequently, the other vehicle can be prevented from colliding with the load 20 and being placed in a dangerous state.

As described above, the collision preventing unit 130 according to the present embodiment changes the mode of the collision prevention process based on both the weight and the shape of the fallen load 20. As a result, the safety of the other vehicle can be ensured. Here, as the mode of the collision prevention process, the stopping position of the automatic-driving vehicle 10 may be changed as according to the present embodiment.

Alternatively, the mode of the notification to the other vehicle may be changed. For example, when the size of the fallen load 20 is small, such as a value that is equal to or less than a predetermined value, and the weight of the load 20 is light, such as a value that is equal to or less than a predetermined value, the control apparatus 100 may only notify the other vehicle of the position, size, and the like of the load 20. In other cases, the control apparatus 100 may additionally transmit a signal requesting that the other vehicle perform braking.

Fourth Embodiment

Next, a fourth embodiment will be described. According to the present embodiment, only the mode of the collision prevention process performed by the control apparatus 100 differs from that according to the first embodiment. The processes performed by the control apparatus 100 will be described with reference to FIG. 10. The series of processes shown in FIG. 10 is performed in place of the series of processes shown in FIG. 6.

The automatic-driving vehicle 10 according to the present embodiment is capable of traveling in a platoon formed with other vehicles. That is, the automatic-driving vehicle 10 can perform so-called "platooning." In platooning, through communication among a plurality of vehicles including the automatic-driving vehicle 10, all of the vehicles can travel at a same speed, decelerate and accelerate at a same timing, and the like. The series of processes shown in FIG. 10 is repeatedly performed each time a predetermined cycle elapses when the automatic-driving vehicle 10 is traveling in a platoon.

At an initial step S31, the control apparatus 100 determines whether a load has fallen onto the road from a load-carrying bed of any of the vehicles included in the platoon. The control apparatus 100 performs the determination based on the detection result of the fall detecting unit 120, in a manner similar to that when the load 20 falls from the load-carrying bed 18 of the automatic-driving vehicle 10. When determined that a load has not fallen onto the road (i.e., a NO determination is made at step S31), the control apparatus 100 proceeds to step S32. In this case, platooning is subsequently continued.

When determined that a load has fallen onto the road at step S31 (i.e., a YES determination is made at step S31), the control apparatus 100 proceeds to step S33. At step S33, the control apparatus 100 performs a process to stop all of the vehicles (including the automatic-driving vehicle 10) that are traveling in the platoon, as the collision prevention process.

The method for stopping the vehicles is the same as the method described with reference to FIG. 3A to FIG. 5B. That is, all of the vehicles that are traveling in the platoon may be stopped on the road shoulder RS so as to follow the arrow AR1 in FIG. 3A, stopped in the same traffic lane as the load 20 so as to follow the arrow AR3 in FIG. 4A, or stopped on the road shoulder RS so as to follow the arrow AR5 in FIG. 5A. After being stopped, all of the vehicles that had been traveling in the platoon may be moved backward so as to follow the arrow AR2 in FIG. 3B, the arrow AR4 in FIG. 4B, or the arrow AR6 in FIG. 5B.

Here, at step S33, the control apparatus 100 may stop only some of the vehicles (such as the vehicle from which the load has fallen) that are traveling in the platoon. The other vehicles may continue traveling in the platoon as is. At this time, the automatic-driving vehicle 10 may be included in the group of vehicles that are stopped or may be included in the group of vehicles that continue traveling in the platoon.

In addition, after all of the vehicles or some of the vehicles traveling in the platoon are stopped as described above, some of the vehicles among the vehicles that are stopped, such as only the rearmost vehicle or the vehicle from which the load has fallen, or only the vehicle from which the load has fallen and the vehicle therebehind, may be moved backward so as to follow the arrow AR2 in FIG. 3B, the arrow AR4 in FIG. 4B, or the arrow AR6 in FIG. 5B.

When a vehicle that is traveling in a platoon is stopped or moved backward as described above, control may be performed so as to stop the vehicle or move the vehicle backward with a wider inter-vehicle distance than when the vehicle is traveling forward in a platoon or in a tracking manner during ordinary times. In addition, only the inter-vehicle distance between some of the vehicles in the platoon, such as the first and second vehicles from the rear, may be widened. When some vehicles are stopped and some vehicles are moved backward, the space between the respective platoons may be changed. Consequently, even should rear-ending by another vehicle occur, a pileup can be prevented.

As described above, according to the present embodiment, in cases in which the automatic-driving vehicle 10 is traveling in a platoon with other vehicles, when the fall detecting unit 120 detects that a load has fallen onto the road from any of the vehicles included in the platoon, the collision preventing unit 130 performs the collision prevention process similar to that described earlier. The collision prevention process in this case includes the process to stop some or all of the vehicles included in the platoon. Consequently, even should a load fall onto the road during platooning, another vehicle can be prevented from colliding with the load.

Fifth Embodiment

Figure 11:
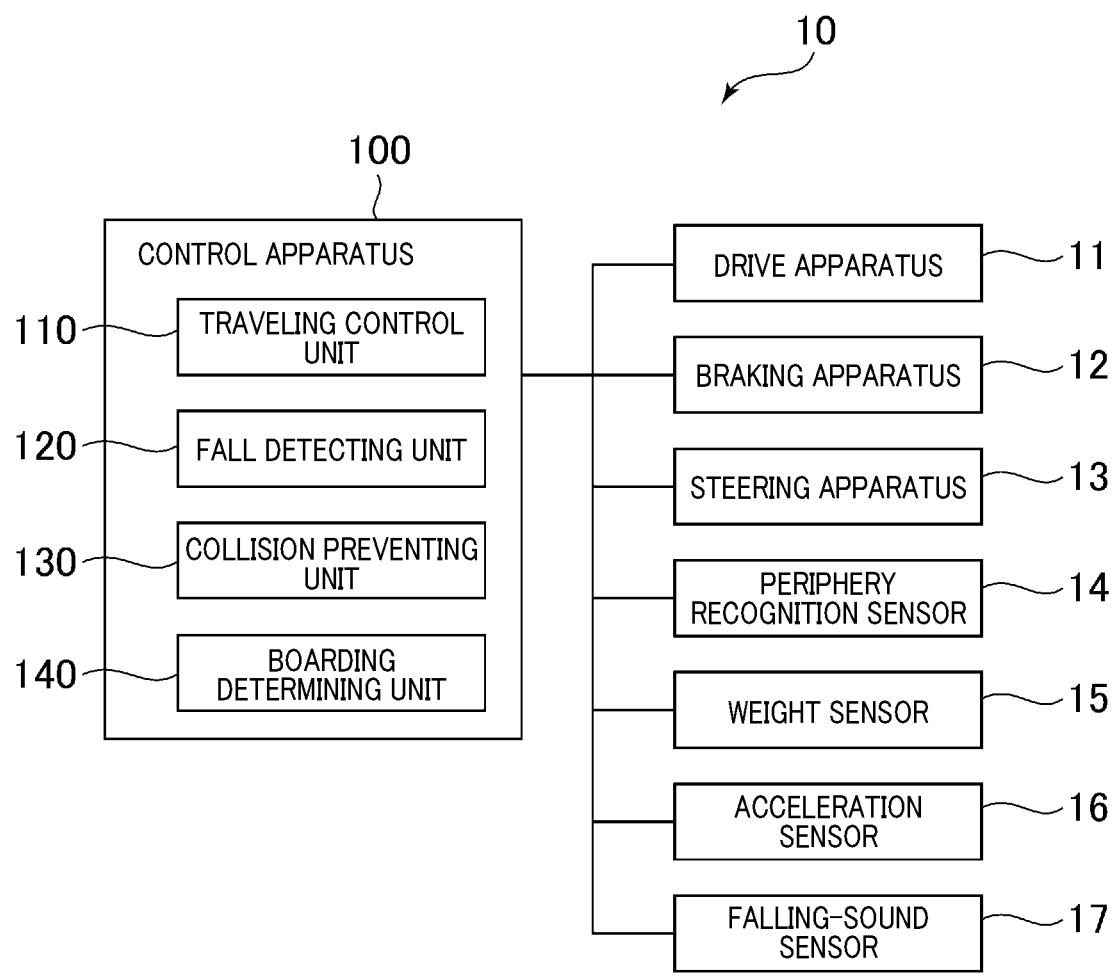
FIG. 11 is a diagram schematically showing an overall configuration of a control apparatus according to a fifth embodiment and an automatic-driving vehicle in which the control apparatus is mounted.

Next, a fifth embodiment will be described. A configuration of the automatic-driving vehicle 10 according to the present embodiment will be described with reference to FIG. 11. As shown in FIG. 11, the preset embodiment differs from the first embodiment in that the control apparatus 10 further includes a boarding determining unit (occupation determining unit) 140. The automatic-driving vehicle 10 according to the present embodiment is capable of traveling in an unmanned state in which no passengers are on board. The above-described boarding determining unit 140 determines whether a person has boarded the automatic-driving vehicle 10 (whether the automatic-driving vehicle 10 is occupied). For example, the boarding determining unit 140 can perform the determination based on an image capturing the interior of the vehicle cabin, or a detection result from a seating sensor provided in each seat.

Figure 12:
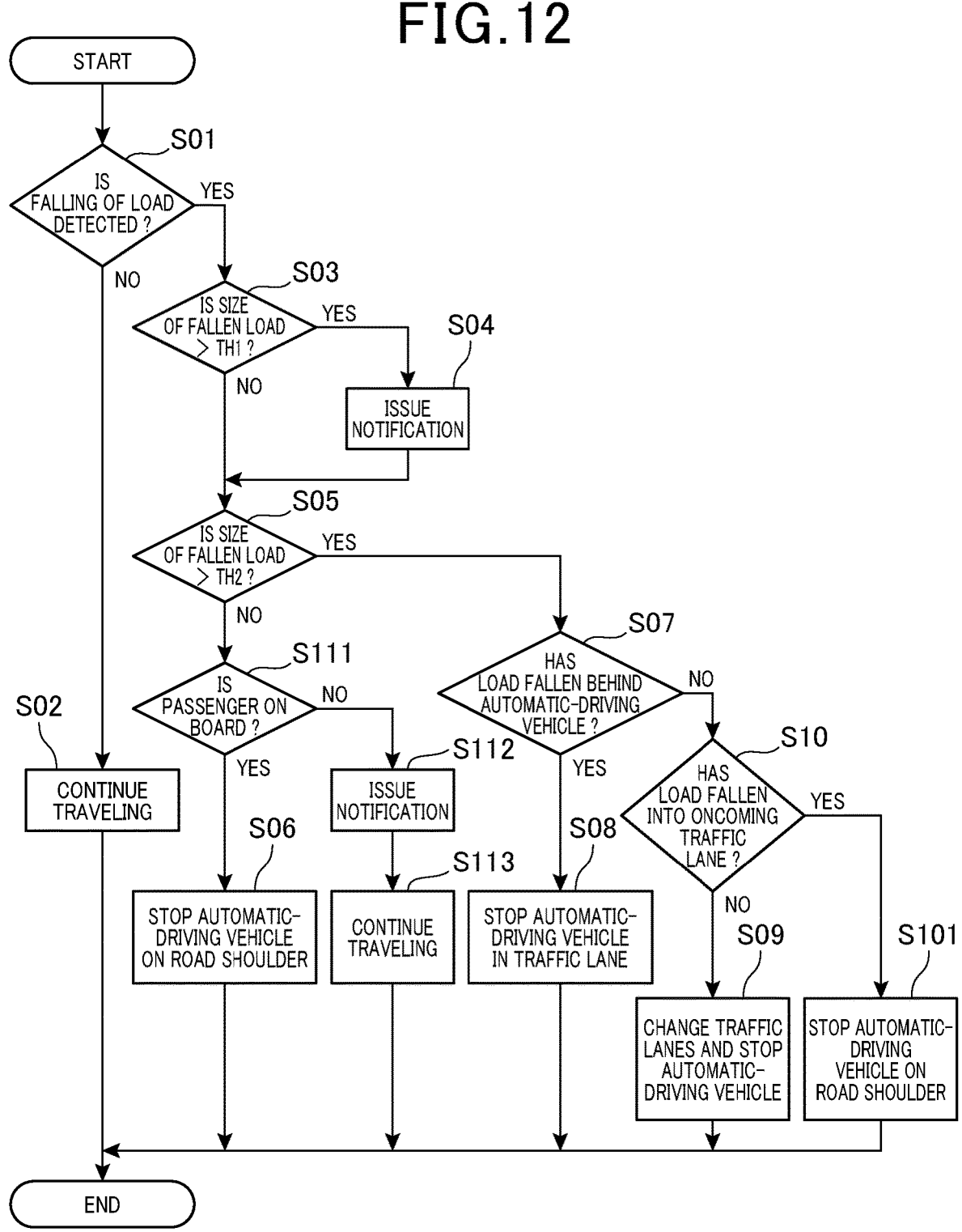
FIG. 12 is a flowchart of the flow of processes performed by a control apparatus according to the fifth embodiment.

Processes performed by the control apparatus 100 according to the present embodiment will be described with reference to FIG. 12. The series of processes shown in FIG. 12 is performed in place of the series of processes shown in FIG. 6. In the series of processes, steps S111, S112, and S113 are added to the series of processes shown in FIG. 6.

When determined that the size of the load 20 is equal to or less than the threshold TH2 at step S05, according to the present embodiment, the control apparatus 100 proceeds to step S111. At step S111, the boarding determining unit 140 determines whether a person is boarded the automatic-driving vehicle 10. When determined that a person is on board the automatic-driving vehicle 10 (i.e., a YES determination is made at step S111), the control apparatus 100 proceeds to step S06. The process performed at step S06 is the same as the process described with reference to FIG. 6.

When determined that a person is not on board the automatic-driving vehicle 10 at step S111 (i.e., a NO determination is made at step S111), the control apparatus 100 proceeds to step S112. At step S112, the process to notify another vehicle in the periphery that the load 20 has fallen is performed in a manner similar to that at step S04. At the same time, at step S12, the control apparatus 10 performs a process to also notify a user (that is, a user that is not on board) of the automatic-driving vehicle 10 that the load 10 has fallen, through wireless communication.

As a result, in addition to the other vehicle in the periphery being prevented from colliding with the load 20, the user can be prompted to take necessary measures. At step S111, the control apparatus 100 may issue the notification to both the other vehicle and the user, as described above. Alternatively, the control apparatus 100 may issue the notification to only either of the other vehicle and the user. In addition, a road manager and the police may be included in the parties to be notified.

At step S113 following step S112, the control apparatus 100 performs a process to make the automatic-driving vehicle 10 continue traveling without stopping. A reason for this is that, even should the automatic-driving vehicle 10 in which a passenger is not on board is stopped close to the load 20, action, such as removing the load 20, cannot be taken.

Here, the automatic-driving vehicle 10 may be stopped on the road shoulder RS in a manner similar to that at step S06. However, should the road shoulder RS be narrower than the vehicle width of the automatic-driving vehicle 10, a portion of the stopped automatic-driving vehicle 10 protrudes into the traffic lane LN1. It is dangerous for the automatic-driving vehicle 10 in which a person is not on board to be left stopped in a state in which the automatic-driving vehicle 10 is protruding into the traffic lane LN1 in such a manner. Therefore, when a passenger is not on board the automatic-driving vehicle 10, it is more preferably for the automatic-driving vehicle 10 to continue traveling without stopping.

As described above, the collision preventing unit 130 according to the present embodiment changes the mode of the collision prevention process based on the determination result of the boarding determining unit 140. Specifically, when a person is not on board the automatic-driving vehicle 10, the collision preventing unit 130 performs the process to notify at least either of the user of the automatic-driving vehicle 10 and another vehicle that is traveling in the periphery (step S112) as the collision prevention process. When a person is on board the automatic-driving vehicle 10, the collision preventing unit 130 performs a process to stop the automatic-driving vehicle 10 (step S106) as the collision prevention process.

Here, even when a passenger is not on board the automatic-driving vehicle 10, when the size or the weight of the fallen load 20 is greater than a predetermined threshold, the process to stop the automatic-driving vehicle 10 ahead of the fallen load 20 may be performed as in the example in FIG. 4. In other words, traveling of the automatic-driving vehicle 10 may be continued as according to the present embodiment only when the size or the weight of the fallen load 20 is equal to or less than the above-described threshold. The above-described threshold may be the same as TH1 and TH2 or may differ therefrom.

The processes at steps S111, S112, and S113 may be performed in a manner similar to that described above when the weight of the fallen load 20 is equal to or less than the threshold TH2 at step S15 in FIG. 7.

The embodiments are described above with reference to specific examples. However, the present invention is not limited to these specific examples. Design modifications in these specific examples made as appropriate by a person skilled in the art are also included in the scope of the present invention, as long as the characteristics of the present invention are included. Elements, and arrangements, conditions, shapes, and the like of these elements provided in the above-described specific examples are not limited thereto, and may be modified as appropriate. Combinations of the elements included in the above-described specific examples may be changed as appropriate, as long as technical contradictions do not occur.

What is claimed is:

1. A control apparatus for an automatic-driving vehicle, the control apparatus comprising:
a processor programmed to:
detect that a load of an own vehicle that is the automatic-driving vehicle has fallen from the own vehicle onto a road; and
perform a collision prevention process that is a process to prevent another vehicle from colliding with the load of the own vehicle in response to the processor detecting that the load of the own vehicle has fallen from the own vehicle onto the road,
wherein the collision prevention process includes a process to stop the automatic-driving vehicle, and
the processor is programmed to stop the automatic-driving vehicle in a same traffic lane as a traffic lane in which the fallen load is present, in the collision prevention process.

2. The control apparatus according to claim 1, wherein:
the processor is programmed to stop the automatic-driving vehicle on a road shoulder in the collision prevention process.

3. The control apparatus according to claim 1, wherein:
when the automatic-driving vehicle is traveling in a platoon with other vehicles, the processor is programmed to perform the collision prevention process even when the processor detects that a load has fallen onto the road from any of the vehicles included in the platoon.

4. The control apparatus according to claim 3, wherein:
the collision prevention process includes a process to stop some or all of the vehicles included in the platoon.

5. A control apparatus for an automatic-driving vehicle, the control apparatus comprising:
a processor programmed to:
detect that a load of an own vehicle that is the automatic-driving vehicle has fallen from the own vehicle onto a road; and
perform a collision prevention process that is a process to prevent another vehicle from colliding with the load of the own vehicle in response to the processor detecting that the load of the own vehicle has fallen from the own vehicle onto the road,
wherein the collision prevention process includes a process to stop the automatic-driving vehicle, and
the processor is programmed to change a stopping position of the automatic-driving vehicle based on a weight or a shape of the fallen load, in the collision prevention process.

6. The control apparatus according to claim 5, wherein:
the processor is programmed to stop the automatic-driving vehicle on a road shoulder when the weight of the fallen load is less than a predetermined threshold, and stop the automatic-driving vehicle in a same traffic lane as a traffic lane in which the fallen load is present when the weight of the fallen load is greater than the predetermined threshold, in the collision prevention process.

7. The control apparatus according to claim 5, wherein:
the processor is programmed to stop the automatic-driving vehicle on a road shoulder when the shape of the fallen load is less than a predetermined threshold, and stop the automatic-driving vehicle in a same traffic lane as a traffic lane in which the fallen load is present when the shape of the fallen load is greater than the predetermined threshold, in the collision prevention process.

8. A control apparatus for an automatic-driving vehicle, the control apparatus comprising:
a processor programmed to:
detect that a load of an own vehicle that is the automatic-driving vehicle has fallen from the own vehicle onto a road; and
perform a collision prevention process that is a process to prevent another vehicle from colliding with the load of the own vehicle in response to the processor detecting that the load of the own vehicle has fallen from the own vehicle onto the road,
wherein the collision prevention process includes a process to issue a notification to another vehicle that is traveling, wherein the processor is programmed to change a mode of the notification based on a weight or a shape of the fallen load, in the collision prevention process, and wherein the processor is further programmed to:
- notify the other vehicle of information of the fallen load, when a size of the fallen load is equal to or less than a predetermined size, and
- notify the other vehicle of a signal requesting that the other vehicle perform braking, in addition to the information of the fallen load, when the size of the fallen load is more than the predetermined size.

9. A control apparatus for an automatic-driving vehicle, the control apparatus comprising:
- a processor programmed to:
  - detect that a load of an own vehicle that is the automatic-driving vehicle has fallen from the own vehicle onto a road; and
  - perform a collision prevention process that is a process to prevent another vehicle from colliding with the load of the own vehicle in response to the processor detecting that the load of the own vehicle has fallen from the own vehicle onto the road,
- wherein the processor is programmed to change a mode of the collision prevention process based on both a weight and a shape of the fallen load.

10. A control apparatus for an automatic-driving vehicle, the control apparatus comprising:
- a processor programmed to:
  - detect that a load of an own vehicle that is the automatic-driving vehicle has fallen from the own vehicle onto a road; and
  - perform a collision prevention process that is a process to prevent another vehicle from colliding with the load of the own vehicle in response to the processor detecting that the load of the own vehicle has fallen from the own vehicle onto the road,
- wherein the processor is programmed to perform a boarding determination to determine whether a person has boarded the automatic-driving vehicle, and
- the processor is programmed to change a mode of the collision prevention process based on a result of the boarding determination,
- wherein the processor is programmed to perform a process to notify at least either of a user of the automatic-driving vehicle and another vehicle that is traveling as the collision prevention process, while continuing traveling of the automatic-driving vehicle without stopping of the automatic-driving vehicle, when a person is not on board the automatic-driving vehicle; and
- the processor is programmed to perform a process to stop the automatic-driving vehicle as the collision prevention process, when a person is on board the automatic-driving vehicle.

11. A control system for an automatic-driving vehicle, the system comprising:
- a processor:
- a non-transitory computer-readable storage medium; and
- a set of computer-readable instructions stored in the computer-readable storage medium that cause the processor to implement:
  - detecting that a load of an own vehicle that is the automatic-driving vehicle has fallen from the own vehicle onto a road; and
  - performing a collision prevention process that is a process to prevent another vehicle from colliding with the load of the own vehicle in response to detecting that the load of the own vehicle has fallen from the own vehicle onto the road,
- wherein the collision prevention process includes a process to stop the automatic-driving vehicle, and
- wherein the processor is programmed to stop the automatic-driving vehicle in a same traffic lane as a traffic lane in which the fallen load is present, in the collision prevention process.

12. A control method for an automatic-driving vehicle, the control method comprising:
- detecting that a load of an own vehicle that is the automatic-driving vehicle has fallen from the own vehicle onto a road; and
- performing a collision prevention process that is a process to prevent another vehicle from colliding with the load of the own vehicle in response to detecting that the load of the own vehicle has fallen from the own vehicle onto the road,
- wherein the collision prevention process includes a process to stop the automatic-driving vehicle, and
- wherein in the collision prevention process, the automatic-driving vehicle is stopped in a same traffic lane as a traffic lane in which the fallen load is present.

\* \* \* \* \*